United States Patent [19]
Park

[11] Patent Number: 5,806,242
[45] Date of Patent: Sep. 15, 1998

[54] PLANT SPROUTING POT

[76] Inventor: Hong Ku Park, 203 Southcrest Dr., Huntsville, Ala. 35802

[21] Appl. No.: 741,532

[22] Filed: Oct. 31, 1996

Related U.S. Application Data

[63] Continuation-in-part of Ser. No. 598,469, Feb. 8, 1996, abandoned.

[51] Int. Cl.[6] .................................................. A01G 31/02
[52] U.S. Cl. ...................................................... 47/81; 47/79
[58] Field of Search .................................... 47/79, 80, 81, 47/DIG. 13

[56] References Cited

U.S. PATENT DOCUMENTS

| | | | |
|---|---|---|---|
| 2,492,152 | 12/1949 | Hollowell | 47/79 N |
| 2,554,302 | 5/1951 | Keskitalo | 47/81 N |
| 2,695,474 | 11/1954 | Barston | 47/81 N |
| 4,014,506 | 3/1977 | Hanson | 47/79 N |
| 4,291,493 | 9/1981 | Monson | 47/79 N |
| 5,225,342 | 7/1993 | Farrell | 47/81 R |
| 5,282,335 | 2/1994 | Holtkamp, Jr. | 47/81 |
| 5,477,640 | 12/1995 | Holtkamp, Jr. | 47/81 |

FOREIGN PATENT DOCUMENTS

| | | | |
|---|---|---|---|
| 2409714 | 9/1975 | Germany | 47/81 |
| 342027 | 10/1959 | Switzerland | 47/81 N |
| 288141 | 9/1928 | United Kingdom | 47/79 |

*Primary Examiner*—Michael J. Carone
*Assistant Examiner*—Joanne C. Downs
*Attorney, Agent, or Firm*—John C. Garvin, Jr.

[57] ABSTRACT

A plant sprouting apparatus for continuously supplying moisture to seeds, seedlings or plants to enhance the germination and growth of the seeds, seedlings and plants. The plant sprouting apparatus comprises an outer container having moisture therein, a connecting ring, an inner container having soil and seeds, seedlings or plants therein in communication with the outer container, a reinforcing ring, and a cover or dome.

26 Claims, 7 Drawing Sheets

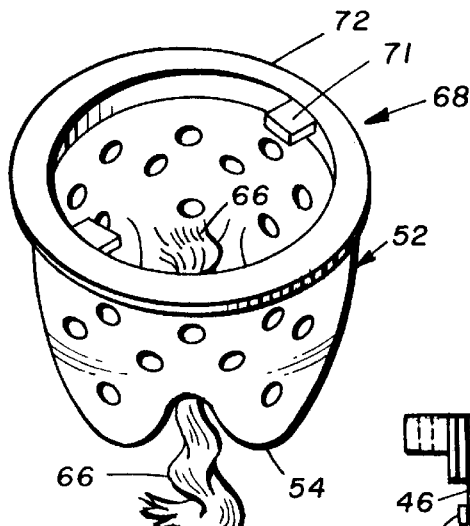
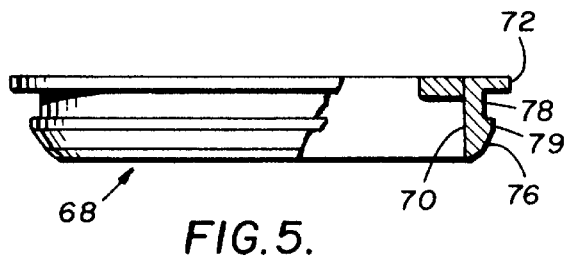
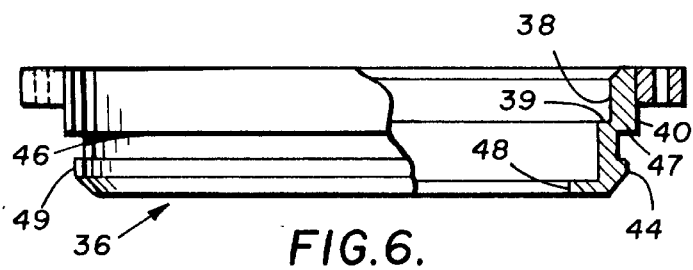
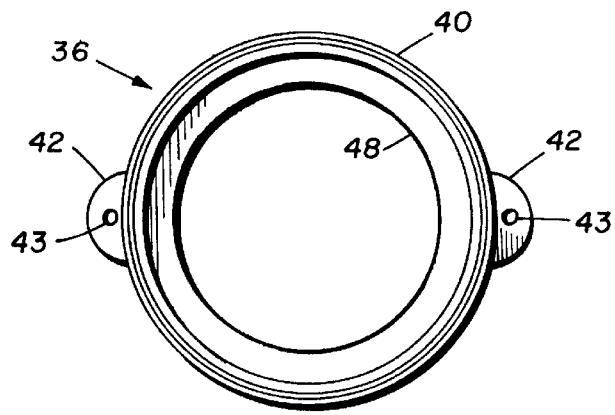
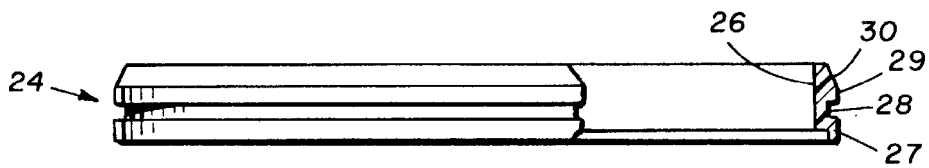

PLANT SPROUTING POT

This application is a continuation-in-part of application, Ser. No. 08/598,469, filed Feb. 8, 1996, now abandoned.

FIELD OF THE INVENTION

The present invention relates to a plant sprouting pot and more particularly to a pot for sprouting seeds, seedlings, or cuttings of plants and growing plants such as ginseng plants.

BACKGROUND OF THE INVENTION

The prior art abounds with pots specifically designed for sprouting and growing plants of numerous varieties from seeds, seedlings or plant cuttings. In order for sprouts and plants to be grown from seeds, seedlings or plant cuttings, it is essential for the seeds, seedlings or plant cuttings to be subjected to suitable moisture and temperature conditions so as to encourage the natural sprouting of the seeds, seedlings or plant cuttings and the growing of the plants. The following U.S. patents are exemplary of such prior art pots: 2,138,188 (Morley); 3,704,545 (Reisen); 4,291,493 (Monson); 5,094,033 (Drew); and 5,375,372 (Lee et al.).

The Morley patent discloses a seedling cultivating flowerpot having a container for receiving soil, a glass cover or dome with an opening therein for allowing air to enter the pot when desired, and a stopper for closing the opening in the cover or dome to preclude air entering the pot when such is not desired. The Reisen patent discloses a plastic container for plants having a pot for a bulb and surrounding earth, a coupling rosette that acts as a lid for the pot, and a cover for the coupling rosette and pot. The Monson patent discloses an apparatus for sprouting seeds including an outer container, an inner container in which seeds are sprouted, a plurality of slits in the inner container for allowing excess moisture to drip from the inner container into the outer container, a cover or dome having a plurality of openings therein for permitting air to enter the inner container, and a nesting structure which provides an air passage between the inner and outer containers. The Drew patent discloses a seed germinator including a soil retention container in which seeds are placed, and a cover having a depression in its top surface with a small hole at the lowest point of the depression so as to allow a liquid placed in the depression to drip through the small hole and fall into the soil retention container. The Lee et al. patent discloses a tissue and seedling culture bottle having a lower container for housing a culture medium and seedlings, a cover or dome including one or more air passages, at least one of which has sterilized absorbent cotton therein, to allow air and gas produced in the bottle during seedling culture or growth to escape from the bottle while preventing bacteria and viruses from entering the bottle.

The prior art pots specifically designed for the sprouting and growing of plants, including those discussed above, have generally suffered from numerous deficiencies and disadvantages particularly in that their structures did not allow adequate moisture to get to the seeds, seedlings, or plant cuttings, together with the plant roots and the soil especially when the cover was in position over the container which housed the soil and seeds, seedlings or plant cuttings.

The instant invention relates to a plant sprouting pot which overcomes the deficiencies or disadvantages of prior art plant sprouting pots in that moisture is supplied to the seed or plant on a continuous and relatively consistent basis from a supply reservoir incorporated in the pot.

SUMMARY OF THE INVENTION

In accordance with the present invention a plant sprouting pot is provided which continuously and consistently supplies moisture to seeds, seedlings, plant cuttings, and the soil or roots of plants therein to enhance the germination and growth of the seeds, seedlings, plant cuttings, and plants. The plant sprouting pot is adapted to rest upon a surface such as a table, or to be housed in an opening within a shelf or the like, or to hang from an overhead structure such as a hook in the ceiling of a room.

The plant sprouting pot is generally comprised of an outer container, a connecting ring, an inner container having soil therein, a reinforcing ring, and a cover or dome. One embodiment of the invention also includes a support collar for supporting the inner container. When assembled with seeds, seedlings, plant cuttings or plants embedded in the soil within the inner container and a liquid within the outer container, as the seeds, seedlings or plant cuttings germinate and the plants grow, moisture captured in the outer container is drawn from the outer container through numerous, small, spaced, openings in the inner container to the soil and seeds, seedlings or plant cuttings or roots of plants within the inner container on a continuous and consistent basis.

Accordingly, it is an object of the present invention to provide an improved pot for furnishing moisture to seeds, seedlings, plant cuttings or plants embedded in soil in the pot.

It is another object of the present invention to provide an improved pot for furnishing moisture to seeds, seedlings, plant cuttings or plants embedded in soil in the pot on a continuing and consistent basis.

It is a further object of the present invention to provide an improved pot which is simple and inexpensive in construction, which may be easily used at home or in other environments, for sprouting seeds, seedlings, plant cuttings and growing plants.

These objects as well as other objects, advantages and features of the present invention will become more readily apparent from the following specification when taken in conjunction with the accompanying drawings.

BRIEF DESCRIPTION OF THE DRAWINGS

FIG. 4 is a perspective view of the inner container of the plant sprouting pot of the present invention having the support collar or sleeve and a single wick secured thereto.

FIG. 5 is a front elevational view, partially broken away, and in section, showing the details of the support collar or sleeve.

FIG. 6 is a front elevational view, partially broken away, and in section, showing the details of the connecting ring.

FIG. 7 is a top plan view showing the details of the connecting ring.

FIG. 8 is a front elevational view, partially broken away, and in section, showing the details of the reinforcing ring.

DETAILED DESCRIPTION OF THE PREFERRED EMBODIMENT

Figure 2:
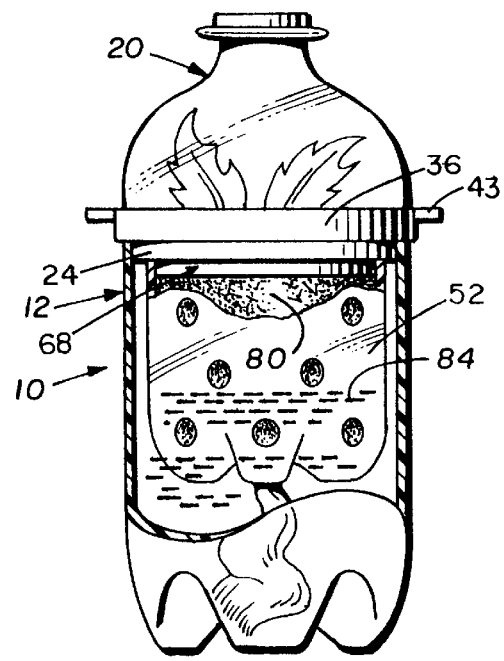
FIG. 2 is a front elevational, partially broken away, view of the plant sprouting pot of the present invention having soil, a plant, and water therein.

Referring now to the drawings, particularly FIG. 2 thereof, reference numeral 10 generally designates the plant sprouting pot of the present invention.

Figure 1:
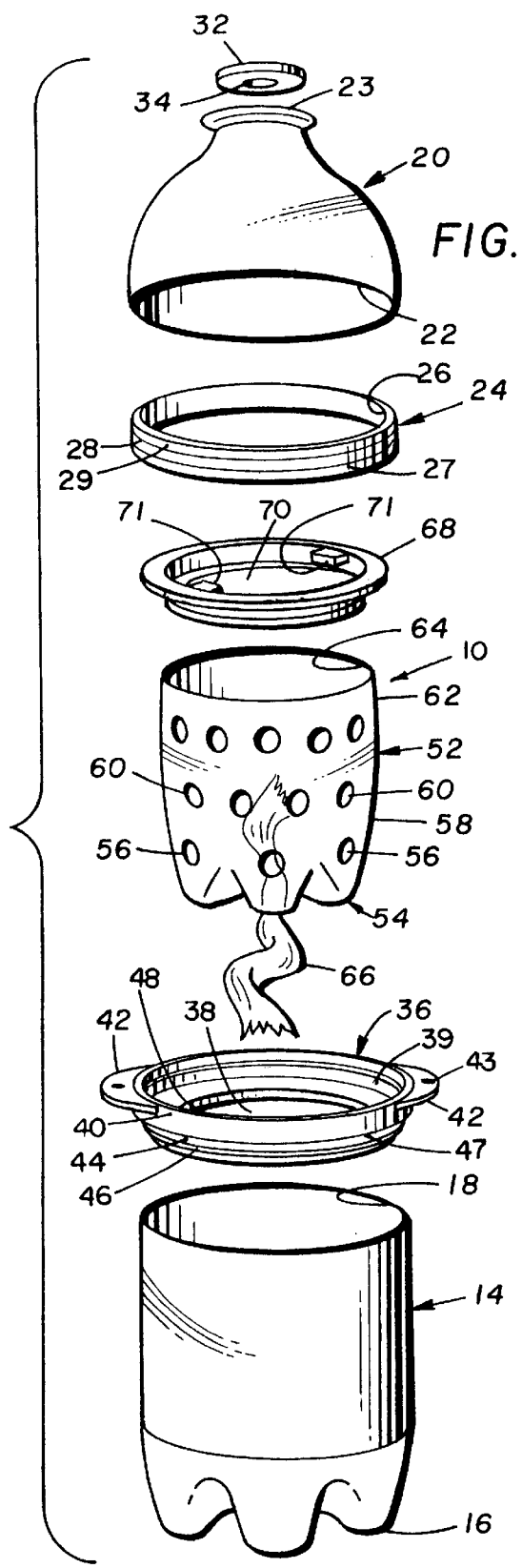
FIG. 1 is an exploded, perspective, view of the plant spouting pot of the present invention.

Referring now to FIGS. 1 and 2, plant sprouting pot 10 generally comprises an outer container 12, a connecting ring 36, an inner container 52, a support collar 68, a reinforcing ring 24, and a cover or dome 20. Outer container 12 includes a lower section 14 having a closed bottom 16; an upper opening 18; and a hollow cover or dome 20 including a lower opening 22, an upper opening 23, and a reinforcing ring 24. As best shown in FIG. 8, reinforcing ring 24 includes a central opening 26, a first annular shoulder 27, a second annular shoulder 29, an annular external groove 28, and an upper tapered portion 30. Reinforcing ring 24 is pressure fitted or secured by any conventional adhesive within the lower opening 22 of cover or dome 20. As best shown in FIG. 1, a cap 32 having a central hole 34 therein is mounted in the upper opening 23 of cover or dome 20 by any conventional means such as threads or adhesives. A ring 36 connects lower section 14 and cover or dome 20 of outer container 12, and as best shown in FIGS. 1, 6 and 7, ring 36 includes a central opening 38, an internal annular shoulder 39, an upper annular portion 40, a pair of handles 42 secured to the upper annular portion 40, a shoulder 47 which is a part of the upper wall of external annular groove 46, and a lower annular portion 44 having the external annular groove 46, and an internal annular shelf 48. Each of handles 42 has an opening 43 therein for purposes to be later explained.

As best seen in FIGS. 1 and 4, inner container 52 includes a lower portion 54 having a plurality of relatively small holes 56 therein; an intermediate portion 58 having a plurality of relatively small holes 60 therein; an upper portion 62 having an upper opening 64 therein; and one or more wicks 66 mounted in a respective hole 56 in lower portion 54. As best seen in FIGS. 4 and 5, a support collar 68 is provided for supporting inner container 52. Support collar 68 has a central opening 70 therein, spaced tabs 71, an upper annular protrusion 72, and, as best seen in FIG. 5, a lower tapered portion 76, an external annular groove 78, and an external annular raised portion 79. The support collar 68 is press fitted into the upper opening 64 of upper portion 62 of inner container 52 to form a part of inner container 52.

Figure 3:
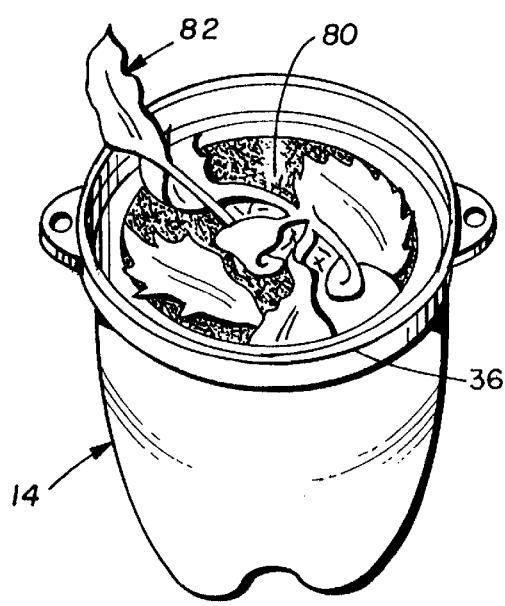
FIG. 3 is a perspective view of the plant sprouting pot of the present invention having a plant growing therein and with the cover removed therefrom.

As best shown in FIGS. 2 and 3, inner container 52 is filled with soil 80 for growing a plant 82 therein. Water 84 is provided in the lower section 14 of sprouting pot 10 for feeding the plant 82.

As best seen in FIG. 2, outer container 12 is substantially larger than inner container 52 to provide a gap therebetween for housing moisture and to permit the roots of growing plants to enter the holes 56 and 60 of inner container 52 and exit the holes 56 and 60 into the gap between the outer wall of inner container 52 and the inner wall of outer container 12. The numerous holes 56 and 60 in the inner container 52 permit the roots to expand and moisture to enter the soil consistently and continuously and keep the moisture within the soil at a generally low level. One or more wicks 66 might be provided to feed moisture from the outer container 12 into the soil 80 within inner container 52; however it has been found that the use of wicks are not essential for moisture to reach soil 80 and the roots of the plants.

The plant sprouting pot 10 of the present invention is assembled to the condition generally depicted in FIG. 2 by first placing water or some premixed solution into outer container 12 such that most, if not all, of the spaced holes 56 in inner container 52 would be below the level of the water or premixed solution; the connecting ring 36 is then inserted into the upper opening 18 of lower section 14 of outer container 12 such that the external raised annular portion 44 of connecting ring 36 tightly engages the inner wall of lower section 14 of outer container 12 adjacent its upper opening 18 with the shoulder 47 of connecting ring 36 being in engagement with the edge of upper opening 18 of lower section 14 of outer container 12; the support collar 68 is then inserted into the upper opening 64 of inner container 52 such that the raised annular portion 79 of support collar 68 tightly engages the inner walls of inner container 52 adjacent its upper opening 64; the inner container 52 (with soil 80 and seeds, seedlings, or plant cuttings embedded therein) is then inserted into the connecting ring 36 to a position where the upper annular protrusion 72 of support collar 68 rests upon the annular internal shelf 48 of connecting ring 36 and the lower holes 56 of inner container 52 are below the level of water or premixed solution in the lower section 14 of outer container 12; and the lower portion of the cover or dome 20 (with the reinforcing ring 24 already press-fitted into the cover or dome 20 adjacent its lower opening 22 and the cap 32 already secured to cover or dome 20) is then inserted into the central opening 38 of connecting ring 36 until the lower portion (adjacent the reinforcing ring 24 in lower opening 22) of cover or dome 20 engages and rests upon the internal annular shoulder 39 of connecting ring 36. When assembled, and if later needed, additional water or premixed solution can be added to the sprouting pot 10 through the hole 34 in cap 32 or added by removing the cover or dome 20.

The engagement of the upper annular protrusion 72 of support collar 68 with the annular internal shelf 48 of connecting ring 36 and the engagement of the lower portion (adjacent lower opening 22) of cover or dome 20 with the internal annular shoulder 39 of connecting ring 36 seals the sprouting pot 10 with air entering the pot 10 through the hole 34 in cap 32. Of course, air will always exist in the gap (space) between the inner container 52 and outer container 12. If desired, the hole 34 in cap 32 can be closed by a plug or the like.

A second embodiment of the sprouting pot is depicted in FIGS. 9–12 with like reference numerals referring to like parts. The embodiment depicted in FIGS. 9–12 differs from that disclosed in FIGS. 1–8 primarily in the combination of the features of the support collar and connecting ring into one part which is designated in the second embodiment as a connecting ring and given reference numeral 90. In this combination, the support collar 68 of the embodiment depicted in FIGS. 1–8 is totally eliminated and the shelf 48 of connecting ring 36 of the embodiment depicted in FIGS. 1–8 is totally eliminated. While not shown in FIGS. 9–12, the second embodiment includes a cover or dome 20, reinforcing ring 24 and cap 32 as shown in the first embodiment (FIGS. 1–8).

Figure 9:
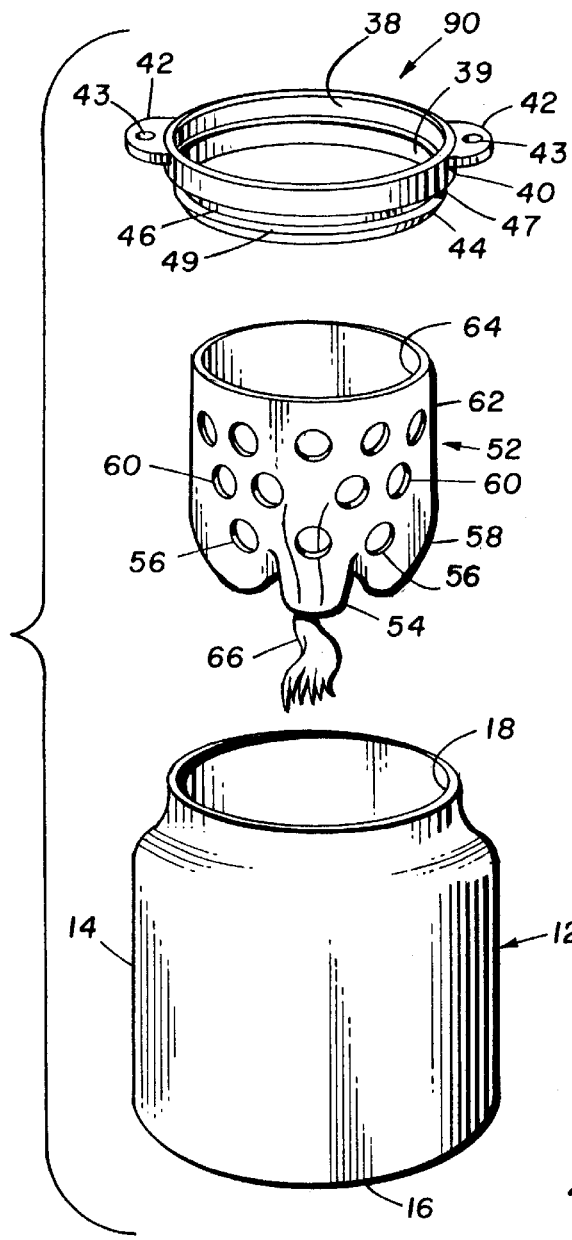
FIG. 9 is an exploded, perspective, view of a second embodiment of the plant sprouting pot of the present invention, but not including its cover or dome with reinforcing ring.
Figure 10:
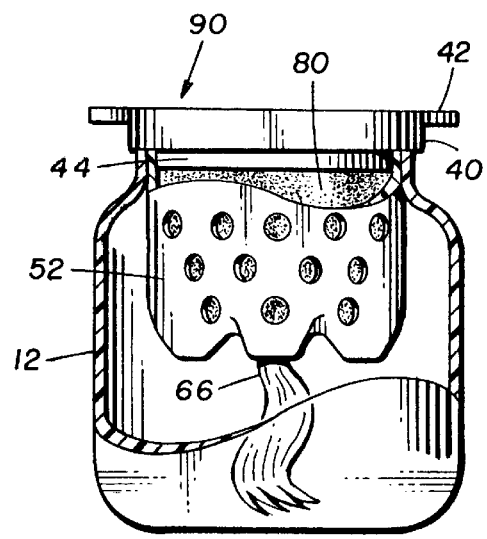
FIG. 10 is a front elevational, partially broken away, view of the second embodiment of the plant sprouting pot of the present invention with the cover or dome removed therefrom.
Figure 11:
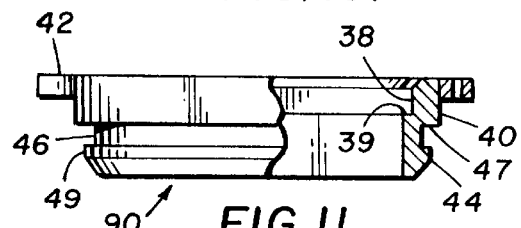
FIG. 11 is a front elevational view, partially broken away, and in section, showing the details of the connecting ring used in the second embodiment of the present invention.
Figure 12:
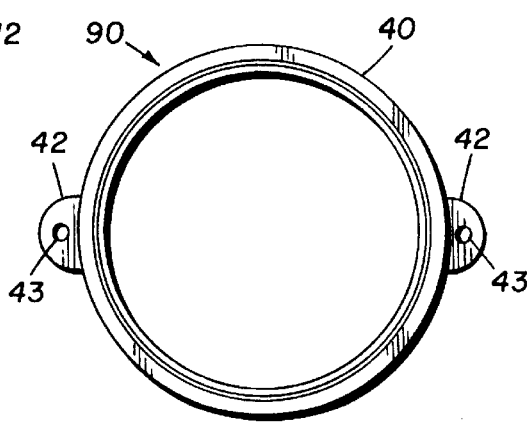
FIG. 12 is a top plan view showing the details of the connecting ring used in the second embodiment of the present invention.

Referring now to FIGS. 9–12, the second embodiment of the plant sprouting pot comprises an outer container 12, a connecting ring 90, an inner container 52, a reinforcing ring 24, and a cover or dome 20. Outer container 12 includes a lower section 14 having a closed bottom 16; an upper opening 18; and a hollow cover or dome 20 including a lower opening 22, an upper opening 23, and a reinforcing ring 24. Ring 90 connects lower section 14 and cover or dome 20 of outer container 12, and also supports inner container 52. As best shown in FIGS. 11 and 12, ring 90 includes a central opening 38, an internal annular shoulder 39, an upper annular portion 40, a pair of handles 42 secured to the upper annular portion 40, a shoulder 47 which is a part of the upper wall of external annular groove 46, and a lower annular portion 44 having the external annular groove 46. Each of handles 42 has an opening 43 therein for purposes to be later explained.

As best seen in FIG. 9, inner container 52 includes a lower portion 54 having a plurality of relatively small holes 56 therein; an intermediate portion 58 having a plurality of relatively small holes 60 therein; an upper portion 62 having an upper opening 64 therein; and one or more wicks 66 mounted in a respective hole 56 in lower portion 54. The ring 90 is press fitted into the upper opening 64 of upper portion 62 of inner container 52.

As best shown in FIG. 10, inner container 52 is filled with soil 80 for growing a plant therein. Water 84 is provided in the lower section 14 of sprouting pot 10 for feeding the plant embedded in the soil 80.

As best seen in FIG. 10, outer container 12 is substantially larger than inner container 52 to provide a gap therebetween for housing moisture and to permit the roots of growing plants to enter the holes 56 and 60 of inner container 52 and exit the holes 56 and 60 into the gap between the outer wall of inner container 52 and the inner wall of outer container 12. The numerous holes 56 and 60 in inner container 52 permit the roots to expand and moisture to enter the soil consistently and continuously and keep the moisture within the soil at a generally low level. One or more wicks 66 might be provided to feed moisture from the outer container 12 into the soil 80 within inner container 52; however it has been found that the use of wicks are not essential for moisture to reach soil 80 and the roots of the plants.

The plant sprouting pot of the second embodiment of the present invention is assembled to the condition generally depicted in FIG. 10 by first placing water or some premixed solution into outer container 12 such that most, if not all, of the spaced holes 56 in inner container 52 would be below the level of the water or premixed solution; the connecting ring 90 is then inserted into the upper opening 64 of inner container 52 (with soil 80 and seeds, seedlings or plant cuttings already embedded in soil 80) such that the raised annular portion 44 of connecting ring 90 tightly engages the inner walls of inner container 52 adjacent its upper opening 64 to secure the connecting ring 90 to inner container 52; then the connecting ring 90 and inner container 52 are inserted into upper opening 18 of the lower portion 14 of outer container 12 until such time that the shoulder 47 of connecting ring 90 engages the wall of lower section 14 of outer container 12 which surrounds upper opening 18 at which time holes 56 and 60 of inner container 52 are below the level of water or premixed solution in the lower section 14 of outer container 12; and the lower portion of the cover or dome 20 (with the reinforcing ring 24 already press-fitted into the cover or dome 20 adjacent its lower opening 22 and the cap 32 already secured to cover or dome 20) is then inserted into the central opening 38 of connecting ring 90 until the lower portion (adjacent the reinforcing ring 24 in lower opening 22) of cover or dome 20 engages and rests upon the internal annular shoulder 39 of connecting ring 90. When assembled, and if later needed, additional water or premixed solution can be added to the sprouting pot 10 through the hole 34 in cap 32.

The sprouting pot 10 can be used when seated upon a flat surface such as a table or window sill, placed in a rack having openings for supporting one or more of the sprouting pots 10, or it can be suspended from the ceiling of a room or porch by inserting and tying the ends of a support filament (not shown) through each of the holes 43 in handles 42 of connecting ring 36. Once plants are growing, the cover or dome 20 can be removed.

Figure 13:
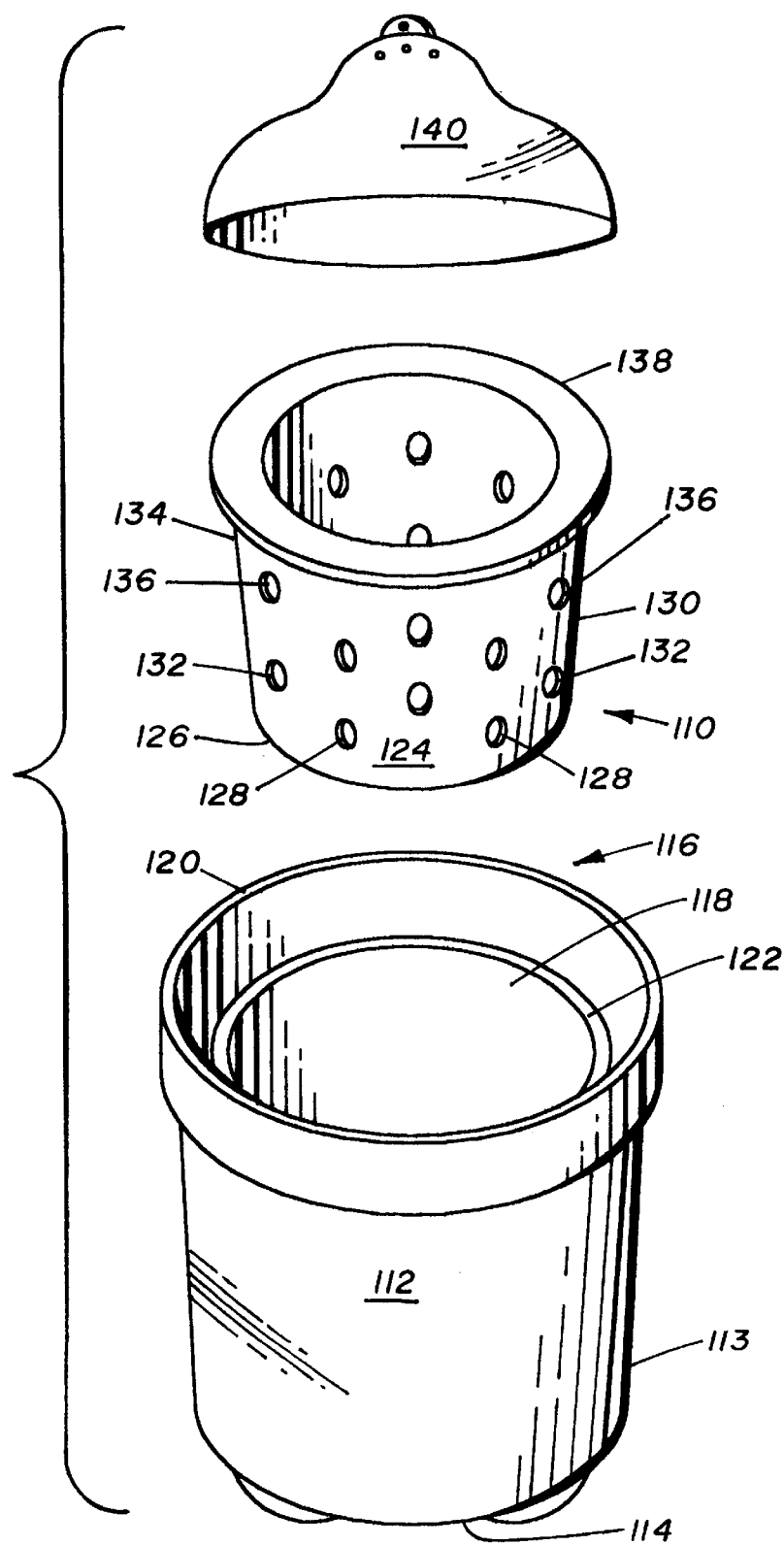
FIG. 13 is an exploded, perspective, view of a third embodiment of the plant sprouting pot of the present invention.
Figure 14:
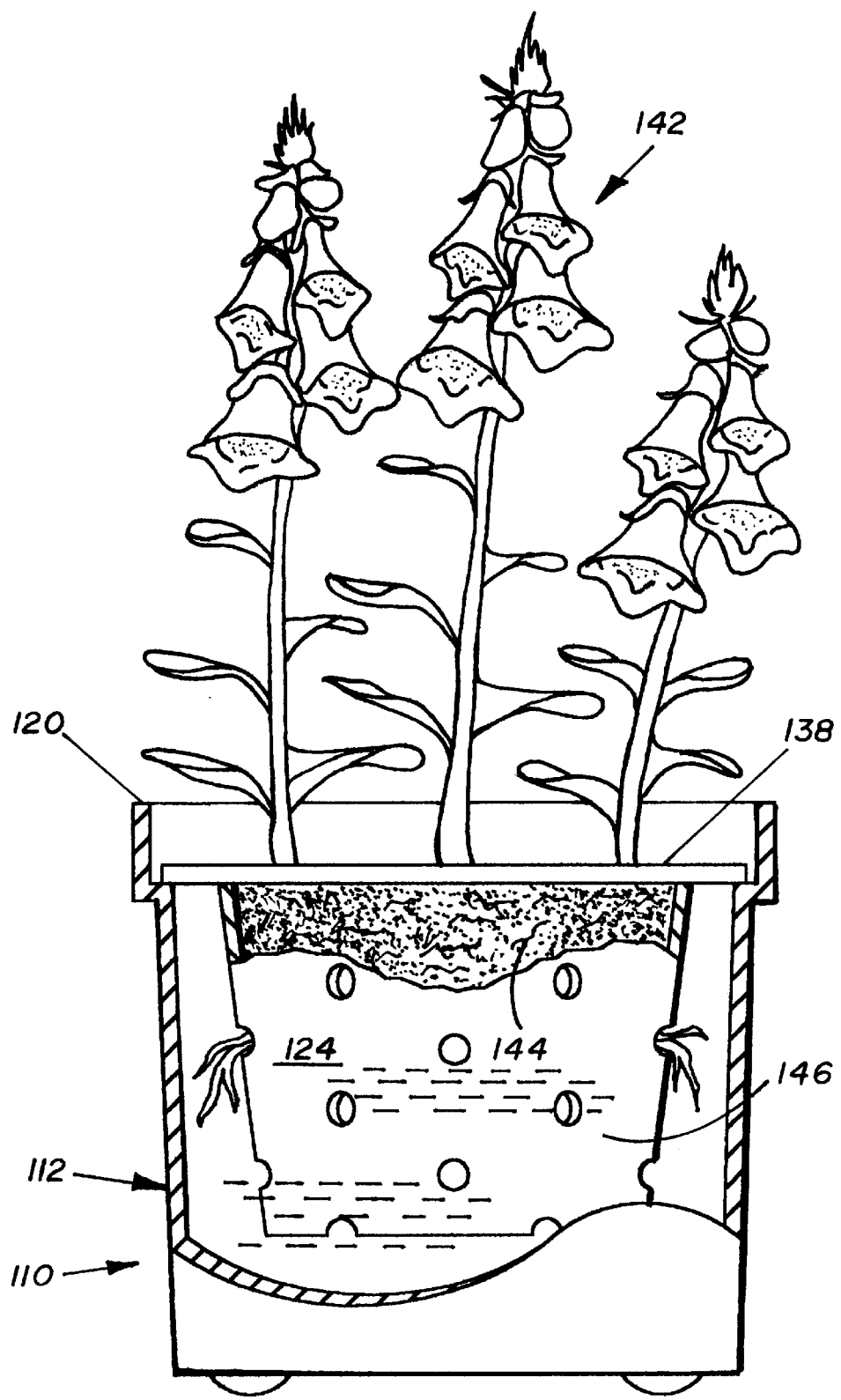
FIG. 14 is a front elevational, partially broken away and in section, view of the third embodiment of the plant sprouting pot depicted in FIG. 13 in an assembled condition, without a cover or dome, and having soil, a plant and water therein.

FIGS. 13 and 14 illustrate, by way of example, a third embodiment of a plant sprouting pot 110 of the present invention. The plant sprouting pot 110 of the third embodiment differs from the plant sprouting pot 10 of the first embodiment (FIGS. 1–8) and the plant sprouting pot 10 of the second embodiment (FIGS. 9–12) primarily in the general construction of the outer container 12, the inner container 52 and the elimination of a separate ring (element 36 in the first embodiment and element 90 in the second embodiment) with the function thereof being provided in the third embodiment by a change in structure of the inner container and outer container as will be explained later.

The third embodiment of the plant sprouting pot 110 comprises an outer container 112, an inner container 124, and a cover or dome 140. Outer container 112 includes a lower section 113 having a closed bottom 114; an interior opening 116 forming an inner wall 118; an upper rim 120; and an inwardly extending shoulder or ledge 122. Inner container 124 includes a lower section 126 having a plurality of relatively small holes 128 therein; an intermediate section 130 having a plurality of relatively small holes 132 therein; an upper section 134 having a plurality of relatively small holes 136 therein; and an annular, outwardly extending, ring 138 in its upper portion 134. As shown in FIG. 13, a cover or dome 140 is provided for possible use with the third embodiment of plant sprouting pot 110 particularly while seeds are germinating or the plants 142 are in their early growing phase. As shown in FIG. 14, inner container 124 is filled with soil 144 for germinating seeds and growing plants 142. Water or premixed solution 146 is provided in the lower section 113 of outer container 112 for feeding the plant 142 or seeds embedded in soil 144.

As best seen in FIG. 14, outer container 112 is substantially larger than inner container 124 to provide a gap therebetween for housing moisture and to permit the roots of growing plants 142 to enter the holes 128 and 132 of inner container 124 and exit the holes 128 and 132 into the gap between the outer wall of inner container 124 and the inner wall 118 of outer container 112. The numerous holes 128 and 132 in inner container 124 permit the roots to expand and moisture to enter the soil consistently and continuously and keep the moisture within the soil at a generally low level. One or more wicks such as shown in the first and second embodiments might be provided to feed moisture from the outer container 112 into the soil 144 within inner container 124; however it has been found that the use of wicks are not essential for moisture to reach soil 144 and the roots of the plants 142.

The plant sprouting pot of the third embodiment of the present invention is assembled from the condition as depicted in FIG. 13 to the condition generally depicted in FIG. 14 by first placing water or some premixed solution 146 into outer container 112 such that the spaced holes 128 in lower section 126 (and possibly the spaced holes 132 in intermediate section 130) of inner container 124 would be below the level of the water or premixed solution 146; the inner container 124 (with soil 144 and seeds, seedlings or plant cuttings already embedded in soil 144) is then inserted into interior opening 116 of the outer container 112 until such time that the annular, outwardly extending, ring 138 of inner container 124 engages the inwardly extending shoulder or ledge 122 of outer container 112, at which time holes 128 (and possibly the holes 132) of inner container 124 are below the level of water or premixed solution 146 in the lower section 113 of outer container 112; and the lower portion of the cover or dome 140 is then inserted into the interior central opening 116 until the lower rim (not numbered) of cover or dome 140 engages and rests upon the outwardly extending annular ring 138 of inner container 124. When assembled, and if later needed, additional water or premixed solution 146 can be added to the sprouting pot 110 by pouring same either directly into the soil 144 or lifting the inner container 124 and pouring same into outer container 112.

The sprouting pot 110 can be used when seated upon a flat surface such as a table or window sill, or placed in a rack having openings for supporting one or more of the sprouting pots 110. Once plants are growing, the cover or dome 140 can be removed.

Figure 15:
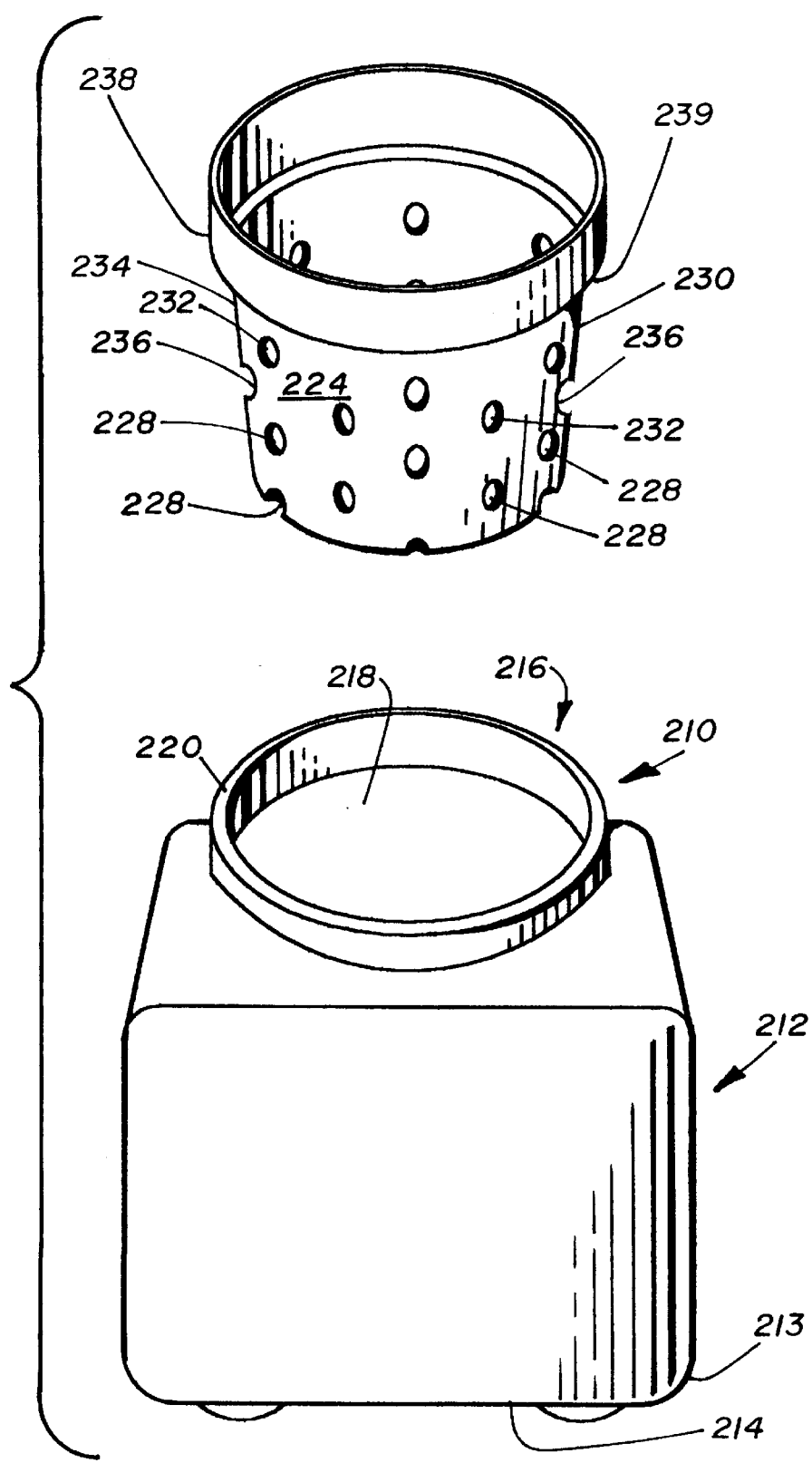
FIG. 15 is an exploded, perspective, view of a fourth embodiment of the plant sprouting pot of the present invention.
Figure 16:
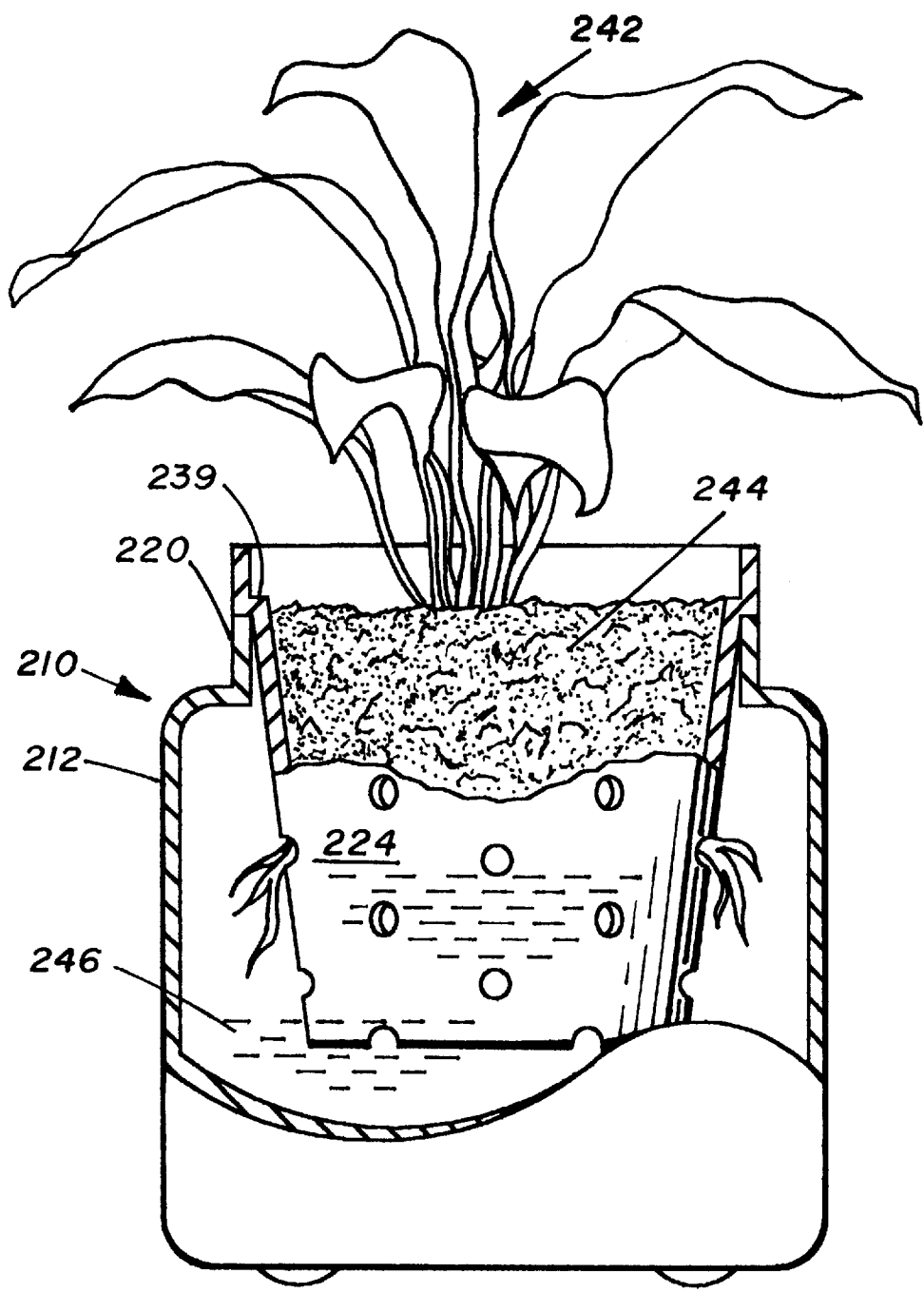
FIG. 16 is a front elevational, partially broken away and in section, view of the fourth embodiment of the plant sprouting pot depicted in FIG. 15 in an assembled condition, and having soil, a plant and water therein.

FIGS. 15 and 16 illustrate, by way of example, a fourth embodiment of the plant sprouting pot 210 of the present invention. The plant sprouting pot 210 of the fourth embodiment is very similar to the plant sprouting pot 110 of the third embodiment (FIGS. 13 and 14) and differs from the plant sprouting pot 10 of the first embodiment (FIGS. 1–8) and the plant sprouting pot 10 of the second embodiment (FIGS. 9–12) primarily in the general construction of the outer container 12, the inner container 52 and the elimination of a separate ring (element 36 in the first embodiment and element 90 in the second embodiment) with the function thereof being provided in the fourth embodiment by a change in structure of the inner container and outer container as will be explained later.

The fourth embodiment of the plant sprouting pot 210 comprises an outer container 212, an inner container 224, and could include a cover or dome similar to cover or dome 140 of the third embodiment. Outer container 212 includes a lower section 213 having a closed bottom 214; an interior opening 216 forming an inner wall 218; and an upper rim 220. Inner container 224 includes a lower section 226 having a plurality of relatively small holes 228 therein; an intermediate section 230 having a plurality of relatively small holes 232 therein; an upper section 234 having a plurality of relatively small holes 236 therein; and an annular, generally L-shaped, outwardly extending, ring 238 in its upper portion 134. A cover or dome similar to cover 140 of the third embodiment might be provided for possible use with the fourth embodiment of plant sprouting pot 210 particularly while seeds are germinating or the plants 242 are in their early growing phase. As shown in FIG. 16, inner container 224 is filled with soil 244 for germinating seeds and growing plants 242. Water or premixed solution 246 is provided in the lower section 213 of outer container 212 for feeding the plant 242 or seeds embedded in soil 244.

As best seen in FIG. 16, outer container 212 is substantially larger than inner container 224 to provide a gap therebetween for housing moisture and to permit the roots of growing plants to enter the holes 228 and 232 of inner container 224 and exit the holes 228 and 232 into the gap between the outer wall of inner container 224 and the inner wall 218 of outer container 212. The numerous holes 228 and 232 in inner container 224 permit the roots to expand and moisture to enter the soil consistently and continuously and keep the moisture within the soil at a generally low level. One or more wicks such as shown in the first and second embodiments might be provided to feed moisture from the outer container 212 into the soil 244 within inner container 224; however it has been found that the use of wicks are not essential for moisture to reach soil 244 and the roots of the plants 242.

The plant sprouting pot of the fourth embodiment of the present invention is assembled from the condition depicted in FIG. 15 to the condition generally depicted in FIG. 16 by first placing water or some premixed solution 246 into outer container 212 such that most, if not all, of the spaced holes 228 in the lower section 226 (and possibly the spaced holes 232 in intermediate section 230) of inner container 224 would be below the level of the water or premixed solution 246; the inner container 224 (with soil 244 and seeds, seedlings or plant cuttings already embedded in soil 144) is then inserted into interior opening 216 of the outer container 212 until such time that the bottom of the annular, generally L-shaped, ring 238 of inner container 224 engages the upper rim 220 of outer container 212 at which time holes 228 (and possibly holes 232) of inner container 224 are below the level of water or premixed solution 246 in the lower section 213 of outer container 212. If used, the lower rim of a cover or dome such as cover 140 of the third embodiment might be inserted into the interior opening 216 until the lower rim (not numbered) of the cover or dome engages and rests upon the ledge 239 within L-shaped ring 238 of inner container 224. When assembled, and if later needed, additional water or premixed solution 246 can be added to the sprouting pot 210 by pouring same either directly into the soil 244 or lifting the inner container 224 and pouring same into outer container 212.

The sprouting pot 210 can be used when seated upon a flat surface such as a table or window sill, or placed in a rack having openings for supporting one or more of the sprouting pots 210. Once plants are growing, the cover or dome, if one is used, can be removed.

The several components of sprouting pot 10, 110 or 210 in each embodiment of the invention can be made of numerous materials including plastics or metal. The preferred material for the outer container 12, 112 or 212 (including lower section 14, 113 or 213 and cover or dome 20 or 140) is a clear, transparent, plastic which would allow light or sunlight to enter pot 10, 110 or 210. A colored (green or black) transparent, plastic is the preferred material for the inner container 52, 124 or 224. The number and sizes of holes 56 and 60, 128, 132, 136 or 228, 232, 236 in inner container 52, 124 or 224 are proportional to the overall size of the pot 10. The sizes and shapes of the several components might be generally cylindrical, square, rectangular or otherwise and need not be as depicted in the drawings. The preferred material for the reinforcing ring 24 in the first and second embodiments is a suitable plastic, but it could be made of a light-weight metal such as aluminum. The preferred material for the connecting rings 36 or 90 and the support collar 68 in the first and second embodiments is a light-weight metal such as aluminum, but such components could be of other materials such as a suitable plastic. The cap 32 in the first and second embodiments can be of any suitable plastic or metal. As is apparent, the inner container 52 and the support collar 68 in the first and second embodiments might be made in one piece, particularly if the material is a plastic is done in the third and fourth embodiments. As is further apparent, the lower portion 14 of outer container 12 and the connecting ring 36 in the first and second embodiments might be made in one piece, particularly if the material is a plastic.

While the above description constitutes the preferred embodiment of the present invention, it will be appreciated that the invention is susceptible to modification, variation and change without departing from the proper scope and fair meaning of the accompanying claims.

I claim:

1. An apparatus for sprouting seeds, seedlings or plant cuttings and growing plants comprising:

an outer container having a closed bottom for confining moisture therein and an upper opening;

an inner container disposed in spaced relation to said outer container and having a soil receiving interior, a bottom portion having a plurality of first passage means therein, an intermediate portion having a plurality of second passage means therein, an upper edge defining an opening leading to said interior, said soil receiving interior disposed for germinating seeds, seedlings or plant cuttings and growing plants therein;

means for supporting said inner container within said outer container such that said bottom portion of said inner container is spaced above said closed bottom of said outer container, but below said moisture confined within said closed bottom of said outer container so that said moisture may enter said pluarality of first and second passage means of said inner container to dampen said soil; and means for closing said apparatus, said closing means including a cover provided with a lower opening defining a rim which telescopes within said means for supporting said inner container.

2. The apparatus of claim 1 wherein said means for supporting said inner container includes a ring for connecting said outer container to said inner container.

3. The apparatus of claim 2 wherein said connecting ring includes a central opening, and an annular shoulder within said central opening.

4. The apparatus of claim 3 wherein said connecting ring further includes an upper external annular portion, a lower external annular portion, and an external annular groove.

5. The apparatus of claim 4 wherein said cover further includes an upper opening, and a reinforcing ring within said lower opening, said lower opening and said reinforcing ring being in engagement with and resting upon said annular shoulder of said connecting ring.

6. The apparatus of claim 5 wherein said means for closing said apparatus further includes a cap secured to said upper opening of said cover.

7. The apparatus of claim 5 wherein each said plurality of first and second passage means in said inner container includes at least one hole therein for allowing said moisture confined in said outer container to enter said soil receiving interior of said inner container.

8. The apparatus of claim 7 wherein said at least one hole in each of said plurality of first and second passage means in said inner container permits the roots of said plant to expand and grow out of said soil receiving interior of said inner container into a gap defined between said inner container and said outer container.

9. The apparatus of claim 5 wherein each of said plurality of first and second passage means in said inner container includes a plurality of spaced holes therein for allowing said moisture confined within said outer container to enter said soil receiving interior of said inner container.

10. The apparatus of claim 9 wherein said plurality of spaced holes in said inner container permit the roots of said plant to expand and grow out of said soil receiving interior of said inner container into said space between said inner and outer containers.

11. The apparatus of claim 5 wherein a wick is placed within said plurality of first passage means to draw moisture from said outer container into said soil receiving interior of said inner container.

12. The apparatus of claim 1 wherein said means for supporting said inner container includes a collar mounted within said opening of said inner container, said collar including a central opening, an upper annular protrusion, a raised annular portion, and an annular groove.

13. The apparatus of claim 12 wherein said means for supporting said inner container further includes a ring for connecting said outer container to said inner container.

14. The apparatus of claim 13 wherein said connecting ring includes a central opening, an annular shoulder within said central opening, and an annular shelf within said central opening.

15. The apparatus of claim 14 wherein said connecting ring further includes an upper external annular portion, a lower external annular portion, and an external annular groove.

16. The apparatus of claim 15 wherein said upper annular protrusion of said collar is in engagement with and rests upon said annular shelf of said connecting ring to seal said closed bottom of said outer container to lessen the evaporation of said moisture.

17. The apparatus of claim 16 wherein said cover further includes an upper opening, and a reinforcing ring within said lower opening, said lower opening and said reinforcing ring being in engagement with and resting upon said annular shoulder of said connecting ring.

18. The apparatus of claim 17 wherein said means for closing said apparatus further includes a cap secured to said upper opening of said cover.

19. The apparatus of claim 1 wherein said first and second plurality of passage means permit the roots of plants growing in said inner container to grow and extend into the space defined between said inner container and said outer container.

20. An apparatus for sprouting seeds, seedlings or plant cuttings and growing plants comprising:

an outer container having a closed bottom for confining moisture therein and an upper opening;

an inner container disposed in spaced relation to said outer container and having a soil receiving interior, a bottom portion having a plurality of first passage means therein, an intermediate portion having a plurality of second passage means therein, an upper edge defining an opening leading to said interior, said soil receiving interior disposed for germinating seeds, seedlings or plant cuttings and growing plants therein; and means for supporting said inner container within said outer container thereby forming a space between said inner and outer containers such that said bottom portion of said inner container is spaced above said closed bottom of said outer container so that said moisture may enter said plurality of first and second passage means of said inner container to dampen said soil and allow the roots of plants growing in said inner container to grow and enter into the space between said inner and outer containers, said means for supporting said inner container including a ring for connecting said inner container to said outer container, said ring having a central opening, an upper external annular portion, and a lower external annular portion, said upper external annular portion and said lower external annular portion being separated by an external annular groove, said lower external annular portion being disposed within said upper opening of said outer container.

21. An apparatus for sprouting seeds, seedlings or plant cuttings and growing plants comprising:

an outer container having a closed bottom for confining moisture therein and an upper open peripheral edge surface;

an inner container disposed in spaced relation to said outer container and having a soil receiving interior, a bottom portion having a plurality of first passage means therein, an intermediate portion having a plurality of second passage means therein, an upper edge defining an opening leading to said interior, said soil receiving interior disposed for germinating seeds, seedlings or plant cuttings and growing plants therein; and means for supporting said inner container within said outer container such that said bottom portion of said inner container is spaced above said closed bottom of said outer container, but below said moisture confined within said closed bottom of said outer container so that said moisture may enter said plurality of first passage means of said inner container to dampen said soil, said means for supporting said inner container within said outer container including a ring having a central opening common with said opening leading to the interior of said inner container and being positioned within said opening leading to the interior of said inner container.

22. The apparatus of claim 21 further including means for closing said apparatus.

23. The apparatus of claim 22 wherein said ring is defined as an annular, outwardly extending, flange on said inner container and wherein said upper open peripheral edge surface of said outer container is provided with a shoulder against which said flange is supported.

24. The apparatus of claim 21 wherein said ring is defined as an annular, outwardly extending, flange on said inner container which is disposed for engagement with said upper open peripheral edge surface of said outer container to support said inner container.

25. An apparatus for sprouting seeds, seedlings or plant cuttings and growing plants comprising:

an outer container having a closed bottom for confining moisture therein and an upper open peripheral edge surface;

an inner container disposed in spaced relation to said outer container and having a soil receiving interior, a bottom portion having a plurality of first passage means therein, an intermediate portion having a plurality of second passage means therein, an upper edge defining an opening leading to said interior, said soil receiving interior disposed for germinating seeds, seedlings or plant cuttings and growing plants therein; and means for supporting said inner container within said outer container thereby forming a space between said inner and outer containers such that said bottom portion of said inner container is spaced above said closed bottom of said outer container so that said moisture may enter said plurality of first passage means of said inner container to dampen said soil and allow the roots of plants growing in said inner container to grow and enter into the space between said inner and outer containers, said means for supporting said inner container including a ring having a central opening common with said opening leading to said interior of said inner container and being positioned within said opening leading to the interior of said inner container.

26. The apparatus of claim 25 further including means for closing said apparatus and wherein said moisture may enter said plurality of second passage means of said inner container to dampen said soil and allow the roots of plants growing in said inner container to grow and enter into the space between said inner and outer containers.

* * * * *